United States Patent [19]
Ikezawa

[11] Patent Number: 5,917,586
[45] Date of Patent: Jun. 29, 1999

[54] LENS METER FOR MEASURING THE OPTICAL CHARACTERISTICS OF A LENS

[75] Inventor: Yukio Ikezawa, Tokyo, Japan

[73] Assignee: Kabushiki Kaisha Topcon, Tokyo, Japan

[21] Appl. No.: 08/823,905

[22] Filed: Mar. 25, 1997

[30] Foreign Application Priority Data

Mar. 26, 1996 [JP] Japan .................................. 8-069765

[51] Int. Cl.⁶ ..................................................... G01B 9/02
[52] U.S. Cl. ........................... 356/124; 356/125; 356/127
[58] Field of Search ................................... 356/124, 125, 356/127

[56] References Cited

U.S. PATENT DOCUMENTS

| | | | |
|---|---|---|---|
| 5,280,336 | 1/1994 | Fantone | 356/124 |
| 5,500,732 | 3/1996 | Ebel et al. | 356/124 |
| 5,574,554 | 11/1996 | Su et al. | 356/124 |
| 5,724,122 | 3/1998 | Oskotsky | 355/53 |

FOREIGN PATENT DOCUMENTS 9-33396  2/1997  Japan .

*Primary Examiner*—Robert Kim
*Attorney, Agent, or Firm*—Finnegan, Henderson, Farabow, Garrett & Dunner, L.L.P.

[57] ABSTRACT

A lens meter is provided in which a beam of light from an illumination optical system (20) is made incident upon a lens (40) to be inspected, the light beam which has passed through the lens (40) is then received by a light receiving sensor (33b) through a lens platform (13) disposed on a lens receiving table (11) and a light receiving optical system (30), and the two-dimensional optical characteristics of the lens (40) are measured from a detection result of the light receiving sensor (33b). In the lens meter, the lens platform (13) is formed to have such an area as to guide light coming from the middle of the lens (40) and from a predetermined range around the middle to the light receiving sensor (33b), and projections (13b) are formed for determining a light reception distance (2) from the lens (40) to a relay lens (32) of the light receiving optical system (30).

5 Claims, 15 Drawing Sheets

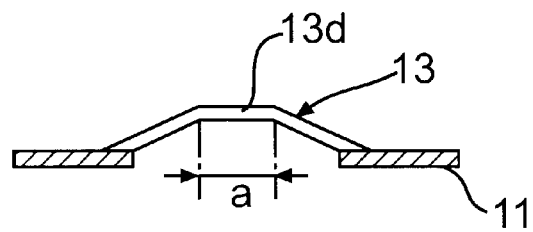
FIG. 5
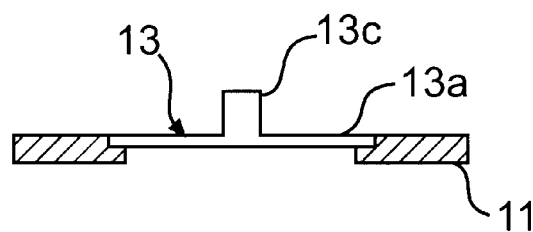
FIG. 6
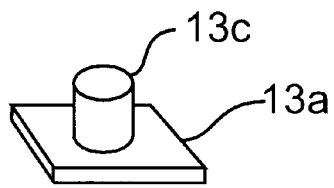 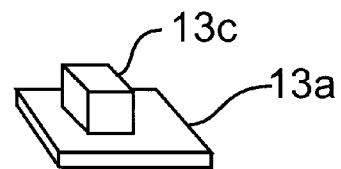
FIG. 7  FIG. 8

LENS METER FOR MEASURING THE OPTICAL CHARACTERISTICS OF A LENS

BACKGROUND OF THE INVENTION

1. Field of the Invention

This invention relates to improvements in a lens meter for measuring two-dimensionally the optical characteristics of a lens to be inspected which is held on a lens receiving plate.

2. Description of the Related Art

Conventionally, there has been known a lens meter in which a lens to be inspected is laid on a lens platform by an inspector, a beam emitted from a light source is then made incident upon the lens, an amount in travel of the beam which has passed through the lens is then detected by a photosensor, and the power at a position on a surface of the lens is measured from the detection result.

In recent years, a progressive multifocal lens and a distance aspheric lens have spread widely as a spectacle lens. With the spread, it has been required to measure the variation of the power at each position on the surface of the lens, that is, to measure the power distribution of the lens. In the conventional lens meter, the lens is successively moved within a plane perpendicular to an optical axis manually by an inspector, and thus the power at the respective positions is read.

Some lens meters of this type have a mechanism for driving the lens with respect to the lens platform. In addition, a lens meter is known in which the two-dimensional power distribution of the lens is measured such that parallel rays of light used as measurement light are projected onto the lens, and moire fringes caused by the travel of the light which has passed through the lens are observed.

However, in the conventional lens meter in which the lens is moved manually by an inspector and then the power at each position of the surface of the lens is measured, there is a problem in that a measuring operation requires much labor and time although the cost of production of the lens is low. In addition, in a lens meter having a driving mechanism for moving the lens automatically within a plane perpendicular to an optical axis, there is a problem in that a mechanical construction becomes complicated and the production costs are raised. In addition, in a lens meter for measuring the power distribution of a lens from the observation of moire fringes, there is a problem in that a lens having a large diameter is required and, worse still, much time is taken to analyze the moire fringes and, as a result, the power distribution cannot be measured promptly.

In order to solve the problems, prior to the present application, the assignee of this invention filed an application for a lens meter, in which a two-dimensionally arranged microlens array used as an optical member for forming many measurement beams of light is disposed between a light source and a lens to be inspected, which is capable of measuring the power distribution at each position of the surface of the lens in a short time and is capable of being constructed at a less cost because the number of light sources to be required is one and a mechanical driving portion is not required (see Japanese Patent Application No. Hei 7-189289, Laid-Open Publication No. Hei 9-33396).

In this lens meter, the lens is mounted on a lens receiving table which is disposed in an optical path between an illumination optical system and a light receiving optical system of a measuring optical system. A beam from the illumination optical system is made incident upon the lens, the beam which has passed through the lens is then received by a photosensor through a light guiding hole formed in the lens receiving table and the light receiving optical system, and the two-dimensional optical characteristics of the lens are measured from a detection result of the photosensor. The axis of the light guiding hole corresponds to the measuring optical axis (the measuring optical center) of the measuring optical system.

In this type of lens meter, a light reception distance on the measuring optical axis from the lens to an optical member of the light receiving optical system or to the photosensor is an essential factor for measuring accurately the optical characteristics of the lens. As the lens to be inspected, use is made of a lens to be machined or processed having a circular shape (i.e., a lens blank), a spectacle lens fitted in a lens frame of spectacles, a spectacle lens of rimless spectacles, or the like.

However, the radius of curvature of a refractive surface of each of these lenses to be machined or processed ranges from a small radius of curvature to a large radius of curvature, depending on the power of the lens. Therefore, when the lens is mounted on the lens receiving table, the light reception distance is varied. This makes it difficult to take an accurate measurement. Further, right and left temples for holding spectacles on the ears make it difficult to mount the spectacles on the lens receiving table in a measurable and stable state.

It might be a possible solution to the problems to dispose the lens platform used in the conventional lens meter on the lens receiving table. Generally, the lens platform is formed in the shape of a cylinder and a frustum, and the diameter at the upper end of the light guiding hole formed inside of the lens platform is made approximately 8φ (8 mm). Besides, a beam of light emitted from the light source has the diameter of approximately 6 to 7 mm and is transmitted by the light guiding hole. As a consequence, in the use of the conventional lens platform whose diameter at its upper end is small, the position of the lower surface of the lens to be machined or processed (the circular lens blank) on the measuring optical axis becomes substantially the same as the position of the end of the lens platform even though the radius of curvature of the lower surface of the lens which faces the lens platform is varied. Accordingly, the optical characteristics of the lens can be measured without much difficulty.

However, the lens platform is made from opaque material, and additionally, in the aforementioned lens meter including the microlens array, the diameter of a beam of measurement light is required to be made several times larger than that of the lens platform. Therefore, the conventional lens platform cannot be applied to the lens meter including the microlens array without any improvement. The same can be said of a lens meter for measuring the wide-ranging two-dimensional optical characteristics of a lens to be inspected without any microlens array.

SUMMARY OF THE INVENTION

Hence, a first object of the present invention is to provide a lens meter which is capable of determining a light reception distance regardless of the type of a lens to be inspected and measuring the wide-ranging two-dimensional optical characteristics of the lens. In order to achieve this object, a lens meter according to the present invention comprises a lens receiving table, an illumination optical system for projecting a beam of illumination light onto a lens to be inspected which is mounted on the lens receiving table, a measuring optical system for guiding the beam transmitted by the lens to a light receiving sensor, arithmetic control means for measuring the two-dimensional optical characteristics of the lens from a detection result of the light receiving sensor, a light guiding portion which is formed in the lens receiving table and is capable of guiding to the light receiving sensor the light coming from the middle of the lens and from an area within a predetermined range around the middle, distance determining means for determining a light reception distance from the lens to an optical member of the light receiving optical system.

A second object of the present invention is to provide a lens meter which is capable of lessening errors in measurement by keeping a light reception distance constant regardless of the type of a lens to be inspected and measuring the wide-ranging two-dimensional optical characteristics of the lens. In order to achieve the second object, in a lens meter according to the present invention, the light guiding portion is a lens platform made from transparent material, and the lens platform has a projection for holding the lens in the middle thereof, and a portion around the projection is a transparent portion serving as a light transmitting portion.

A third object of the present invention is to provide a lens meter which is capable of measuring a light reception distance with accuracy so that the optical characteristics of the measured lens can be corrected with accuracy and measuring the wide-ranging two-dimensional optical characteristics of the lens. In order to achieve the third object, in a lens meter according to the present invention, the light guiding portion is a light guiding hole having a large diameter, and height detecting means for detecting the height from the lens receiving table to the lower surface of the lens on the optical axis of a beam of measurement light is disposed as the distance determining means.

BRIEF DESCRIPTION OF THE DRAWINGS

FIG. 5 is a sectional view showing a modification of a lens platform shown in FIG. 3.

FIG. 6 is a sectional view showing another modification of the lens platform shown in FIG. 3.

FIG. 7 is a perspective view showing a configuration of a projection of the lens platform shown in FIG. 6.

FIGS. 8 to 11 are perspective views, each showing another configuration of the projection of the lens platform shown in FIG. 6.

DESCRIPTION OF THE PREFERRED EMBODIMENTS

Figure 1:
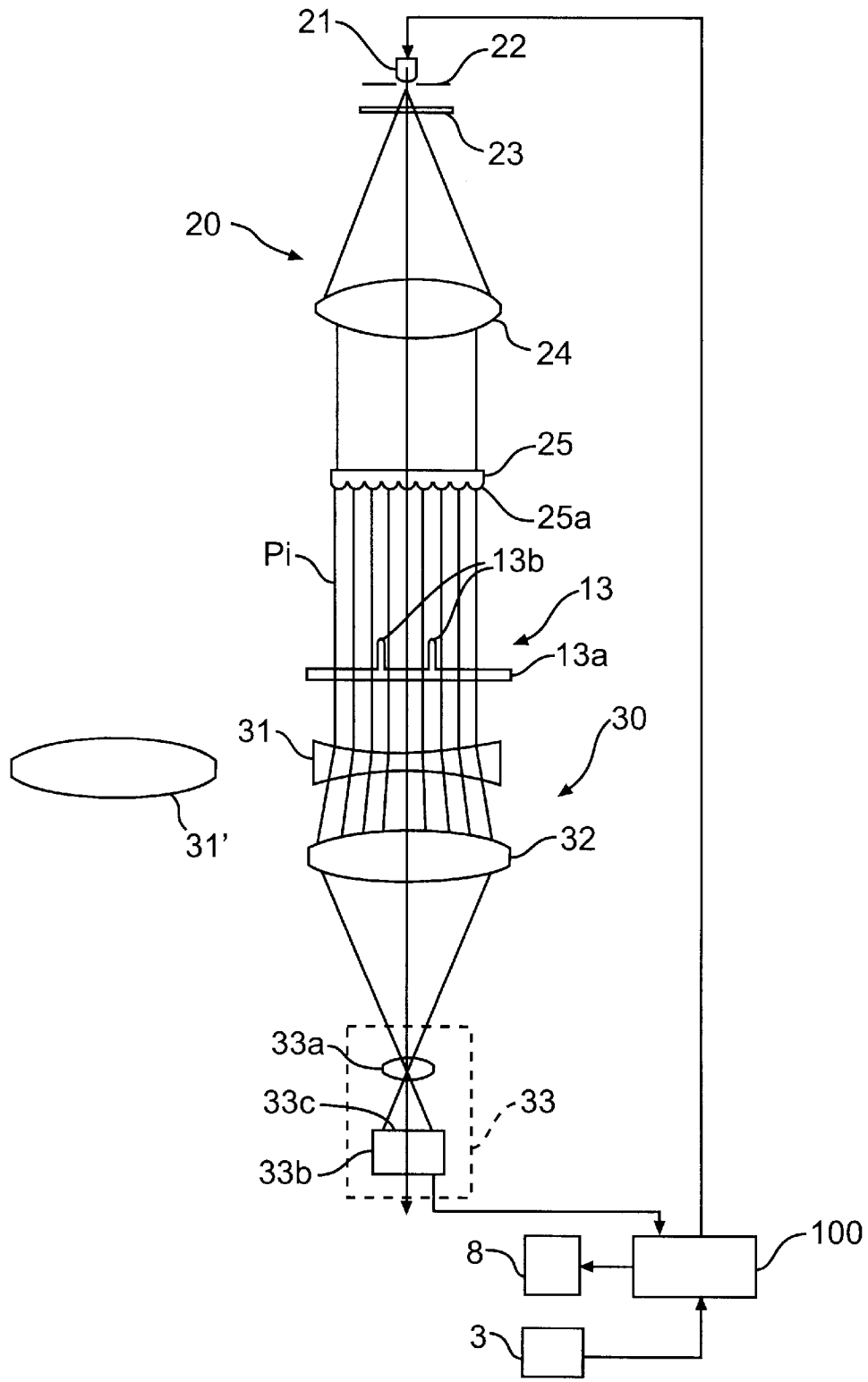
FIG. 1 is an optical view showing a state in which a lens to be inspected is not yet set on an optical path for measurement and an auxiliary lens for measurement is inserted which has negative power of which a power distribution is known.

Embodiments of the present invention will be described hereunder with reference to the attached drawings. FIGS. 1 to 29 show an example of a measuring optical system of a lens meter according to the embodiments of the present invention.

First Embodiment

FIGS. 1 to 21 show a first embodiment. In FIG. 2, reference character 1 denotes a lens meter according to the present invention, reference character 2 denotes a main body of the lens meter 1, reference character 3 denotes a keyboard formed in the front lower-end part of the main body 2, reference characters 4, 5 denote switches formed in the left-end part of the keyboard 3, reference character 6 denotes a plurality of membrane switches formed in the middle part of the keyboard 3, and reference character 7 denotes a ten-key formed in the right-end part of the keyboard 3. Description of the functions of the switches 4, 5, the plurality of membrane switches 6, the ten-key 7, and the like is omitted. The switches 4, 5, the plurality of membrane switches 6, the ten-key 7, and the like are used when optical characteristics are measured. A signal from each of the switches of the keyboard 3 is inputted in an arithmetic control circuit (arithmetic control means) 100.

The main body 2 is provided with a display unit 8, such as a CRT or a liquid-crystal display, in the upper end part thereof, which is used as display means. Further, the main body 2 is provided with an upper optical-member-disposition portion 9 and a lower optical-member-disposition portion 10, which are projected at an interval between each other in the up and down direction on the front side thereof. A lens-receiving table 11 is formed integrally with the lower optical-member-disposition portion 10 on the upper end thereof. The operation of the display unit 8 is controlled by the arithmetic control circuit 100.

Figure 3:
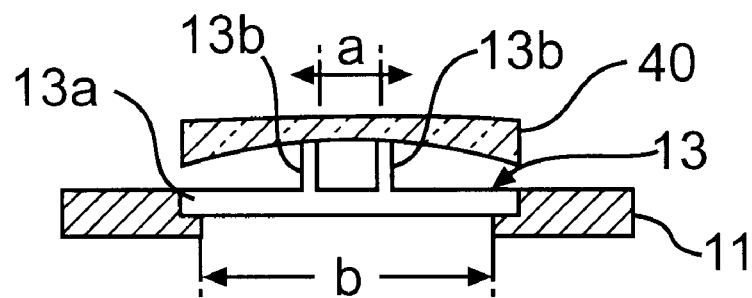
FIG. 3 is a sectional view of the main part of the lens meter shown in FIG. 2.
Figure 4:
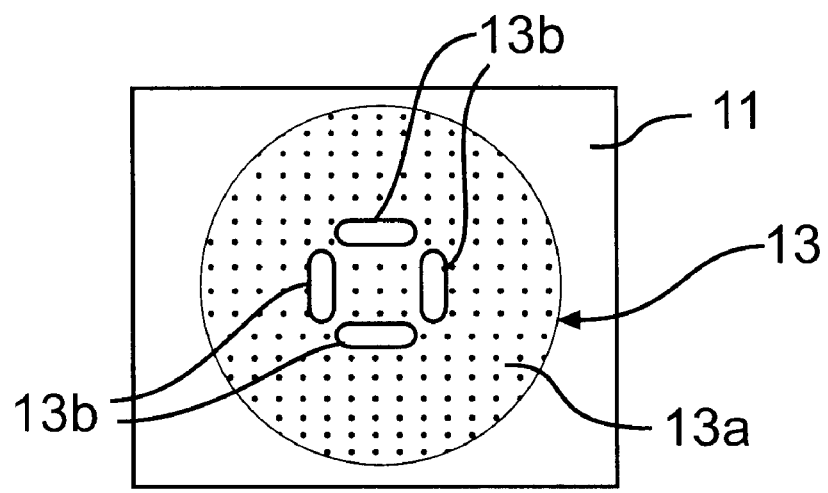
FIG. 4 is a plan view showing a state in which the lens shown in FIG. 3 has been removed.

As shown in FIGS. 3 and 4, a step-cut attachment opening 12 (not shown) having a large diameter is formed in the lens-receiving table 11, and a lens platform 13 used as a light guiding portion (a light transmitting portion) is attached to the attachment opening 12. The lens platform 13 consists of a circular and flat transparent plate 13*a* which is made of transparent glass, transparent resin, or the like, and four flat projections 13*b* (distance determining means) for holding a lens, which project from the central part of the upper surface of the transparent plate 13*a*. The four flat projections 13*b* are, as shown in FIG. 4, disposed in the form of a regular square. The interval a between the facing projections 13*b*, 13*b* is designed to be 8 mm, and the minimum diameter b of the step-cut attachment opening 12 is designed to be 40 φ (40 mm).

In this embodiment, the plurality of flat projections 13*b* are formed in the central part of the transparent plate 13*a*. However, the present invention is not necessarily limited to this construction. For example, as shown in FIG. 5, the lens platform 13 may be formed to have a tapered shape and a flat top part, instead of the projections 13*b*. In this case, a top plane 13*d* having a diameter of, for example, 8 mm is formed in the center of the lens platform 13 shown in FIG. 5.

Further, as shown in FIG. 6, a projection 13*c* having a pillarlike side configuration may be formed in the center of the transparent plate 13*a*. As shown in FIG. 7, the projection 13*c* may be formed in a circular pillar, and also in a square pillar, as shown in FIG. 8. In this case, in FIG. 6, the top plane (not shown) of the projection 13*c* has a diameter, or a length of a side, of 8 mm, for example.

In this embodiment, each size of the portions of the lens platform 13 is given specifically. However, the present invention is not necessarily limited to the portions of the lens platform 13 having these sizes. In other words, each size of the portions may be varied somewhat around the numerical values shown in this embodiment.

Figure 9:
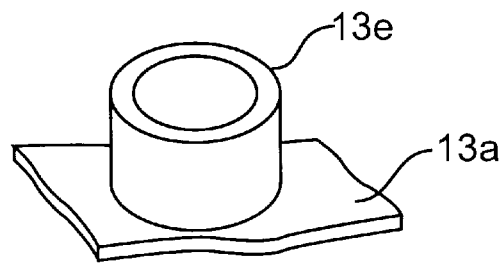
Figure 10:
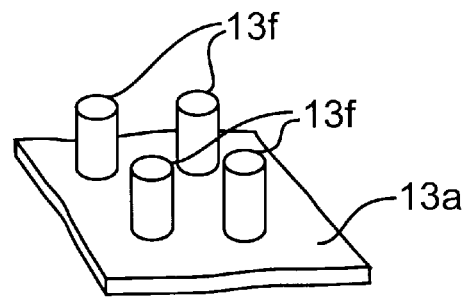
Figure 11:
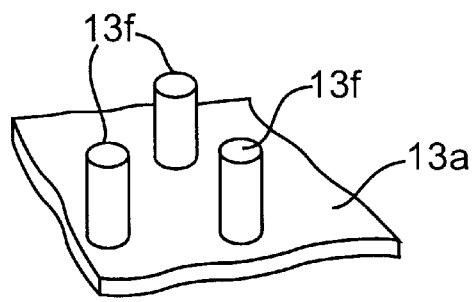

Further, as shown in FIG. 9, a cylindrical projection 13*e*, instead of the projections 13*b*, may be formed in the transparent plate 13*a*, and in addition, as shown in FIG. 10 or 11, four or three cylindrical projections 13*f* having small diameters may be formed adjacently to one another in the center of the transparent plate 13*a*.

Figure 2:
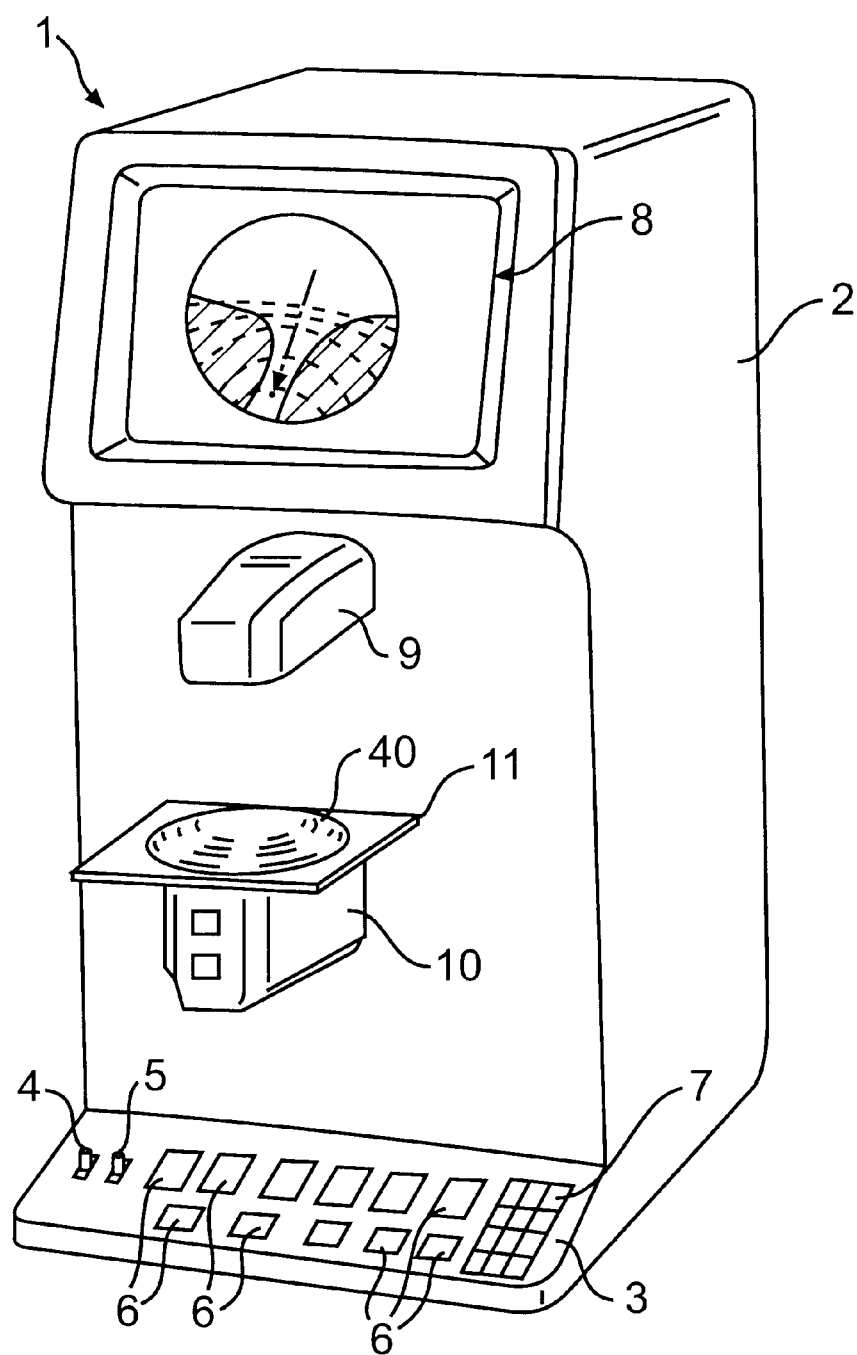
FIG. 2 is a perspective view of a lens meter including a measuring optical system shown in FIG. 1.

A measuring optical system shown in FIG. 1 is disposed inside of the main body 2 of the lens meter 1. The measuring optical system is made up of an illumination optical system 20 and a light receiving optical system 30. In the illumination optical system 20, optical members of a light source 21, a diaphragm 22, a filter 23, a collimator lens 24, a microlens array 25, and the like are disposed in order of mention, and in the light receiving optical system 30, optical members of a measuring auxiliary lens 31, a relay lens 32, a CCD camera 33, and the like are disposed in order of mention.

A part of the illumination optical system 20 is disposed inside of the upper optical-member-disposition portion 9, and a part of the light receiving optical system 30 is disposed inside of the lower optical-member-disposition portion 10. A tungsten lamp whose light emission is controlled by the arithmetic control circuit (arithmetic control means) 100 is used as the light source 21, and the CCD camera 33 includes a lens 33*a* and a light receiving sensor 33*b*. An output from the light receiving sensor 33*b* is inputted in the arithmetic control circuit 100. The filter 23 is designed to transmit a beam of light having a wavelength around the e-ray and to intercept a beam of light except the e-ray.

In the illumination optical system 20, an illumination beam emitted by the light source 21 is guided to the collimator lens 24 through the diaphragm 22 and the filter 23, is then made parallel rays of light by the collimator lens 24, and is led to the microlens array 25.

The microlens array 25 includes a number of minute lenses 25*a* which are arranged in two dimensions. The minute lenses 25*a* are, for example, spherical lenses shown in FIG. 18. The minute lenses 25*a* have practically one identical focal distance, and the number of the minute lenses 25*a* is approximately 1000 pieces. The microlens array 25 serves as optical members, arranged two-dimensionally and corresponding to the number of the minute lenses, for producing many measurement beams Pi according to the parallel rays. A pin hole plate having a number of pin holes, instead of the microlens array 25, may be used as the optical member.

The lens platform 13 is disposed between the microlens array 25 and the relay lens 32, and lenses to be inspected 40, 40' (mentioned later) are set on the projections 13*b* of the lens platform 13. Besides, the lenses 40, 40' are designed to be disposed adjacent to a position of a focal point on the rear side of the microlens array 25 according to the lens platform 13.

Figure 19:
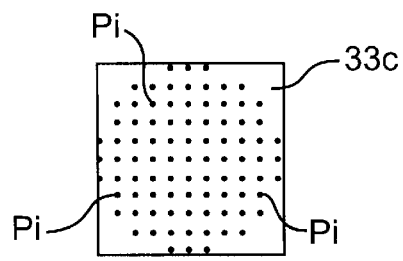
FIG. 19 is an explanatory view showing that a light-spot image of the measuring light beam is distributed uniformly all over a light receiving area of a light receiving sensor when the measuring auxiliary lens having a known power distribution and negative power is inserted in the measuring optical path.

The measuring auxiliary lens 31, whose power distribution is known, has negative power and is inserted between the lens platform 13 and the relay lens 32. The measuring auxiliary lens 31 is designed such that the measurement beams Pi transmitted by the measuring auxiliary lens 31 are, as shown in FIG. 19, distributed uniformly all over a light receiving area 33*c* of the light receiving sensor 33*b* when the lenses 40, 40' are not set on the lens platform 13, in other words, when the lenses 40, 40' are not inserted in a measuring optical path.

Figure 12:
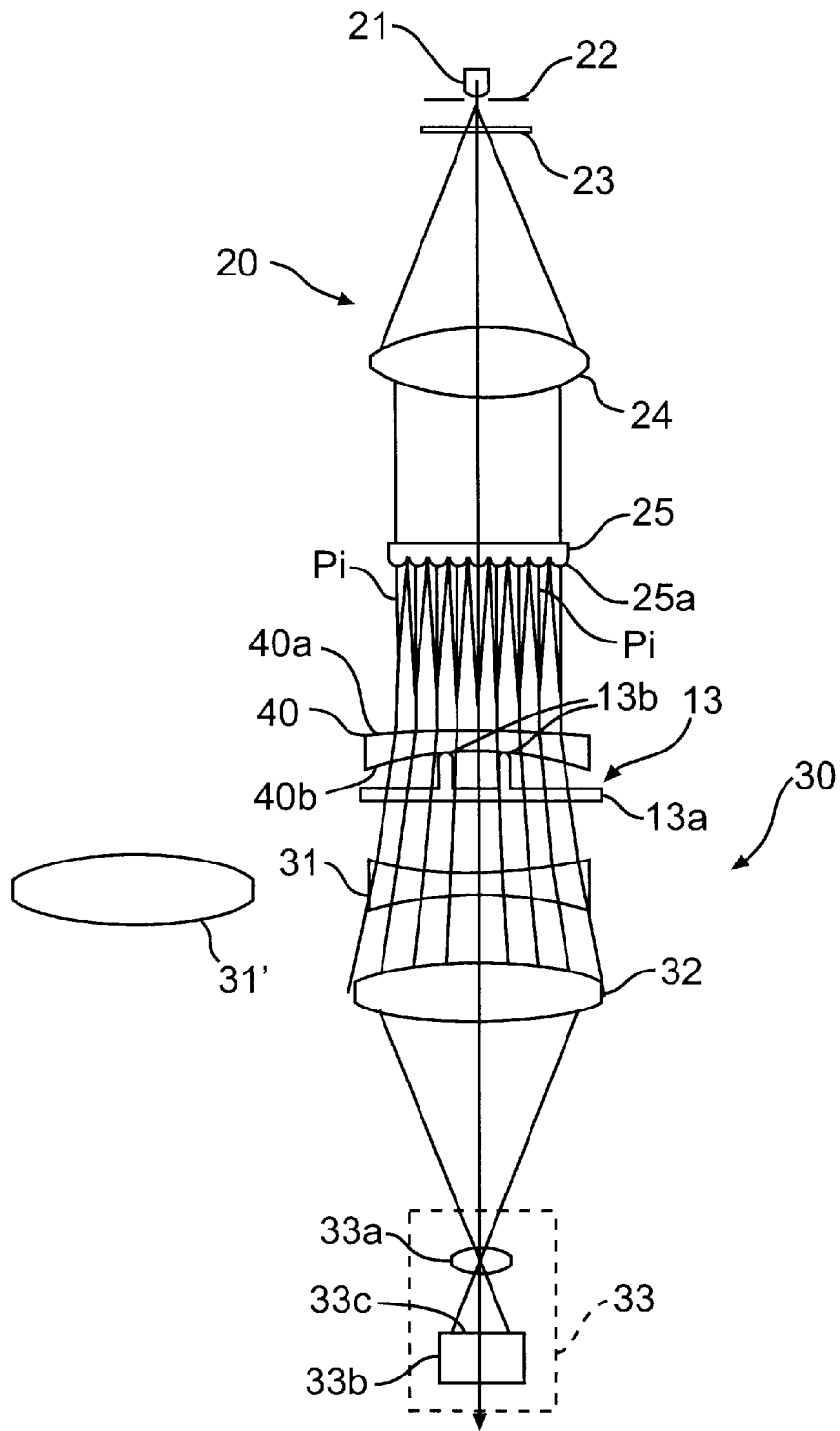
FIG. 12 is an optical view showing a state in which the lens having negative power and the auxiliary lens having a known power distribution and negative power are inserted in the optical path for measurement.
Figure 20:
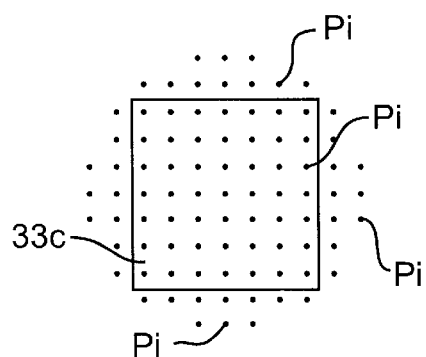
FIG. 20 is an explanatory view showing that a part of the light-spot image of the measurement beam is located outside of the light receiving area of the light receiving sensor.

In the case where the lens 40 having negative power is set in the measuring optical path, as shown in FIG. 12, the measurement beams Pi which have been refracted outwardly by passing through the lens 40 pass through the measuring auxiliary lens 31, and thus are refracted more outwardly. Therefore, as shown in FIG. 20, a part of the measurement beams Pi is brought out of the light receiving area 33*c* of the light receiving sensor 33*b*, and thereby the number of the measurement beams Pi on the light receiving area 33*c* is reduced. Accordingly, the number of the measurement beams Pi on the light receiving area 33*c* is counted, so that it can be judged whether or not the lens 40 has negative power. This judgment is given by the arithmetic control circuit 100.

Figure 13:
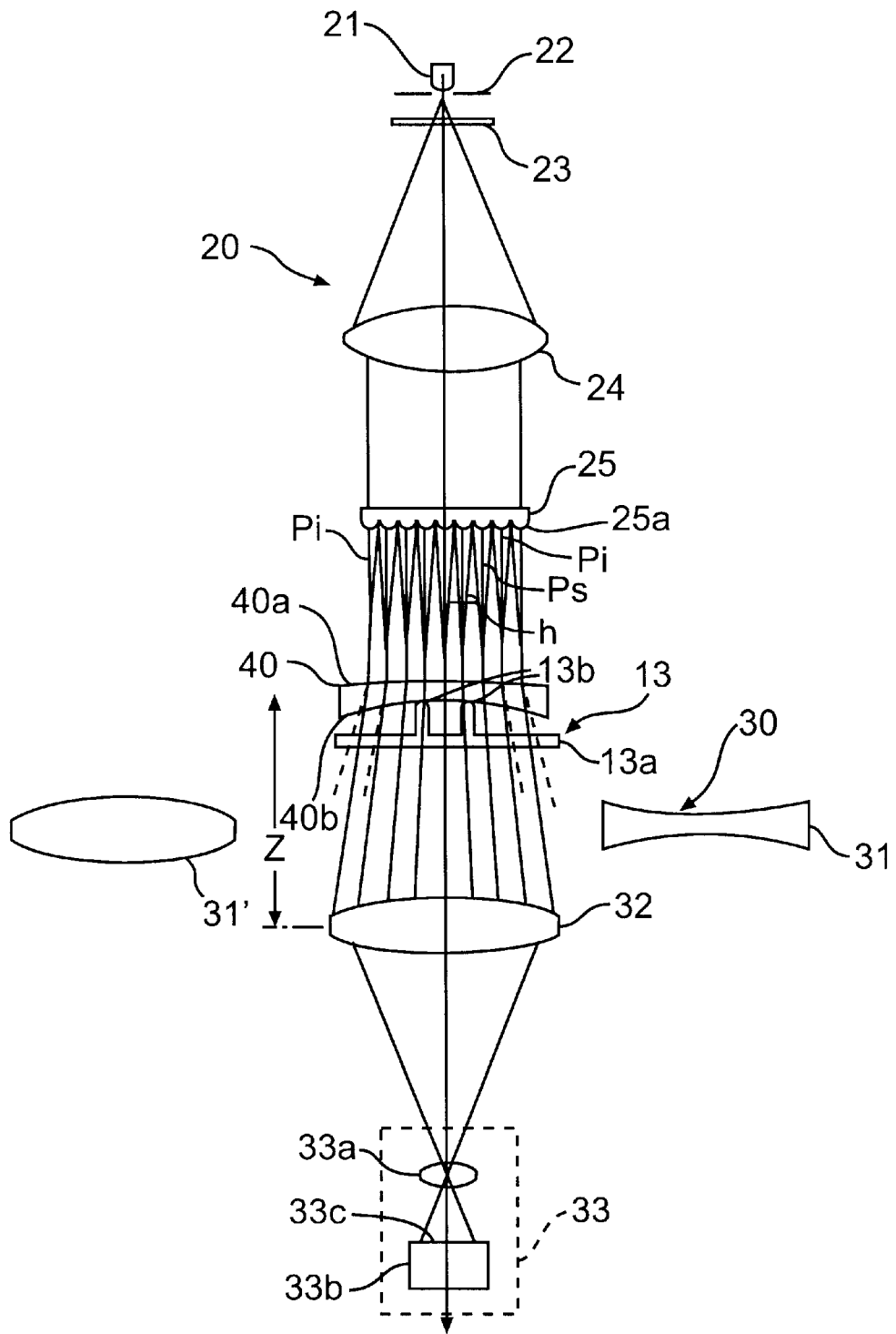
FIG. 13 is an optical view showing a state in which the lens having negative power is inserted in the optical path for measurement and the auxiliary lens for measurement is removed from the optical path.
Figure 21:
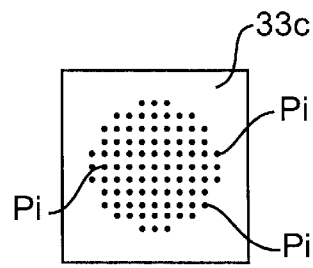
FIG. 21 is an explanatory view showing that the light-spot image of the measurement beam is not located outside of the light receiving area of the light receiving sensor when the lens having negative power and an unknown power distribution is set on the measuring optical path, and the measuring auxiliary lens having a known power distribution and negative power is removed from the measuring optic path.

In the case where the lens 40 has been judged to have negative power, as shown in FIG. 13, the measuring auxiliary lens 31 whose power distribution is known and whose power is negative is removed from the measuring optical path. When the measuring auxiliary lens 31 is removed from the measurement optical path, the power distribution of the lens 40 is designed to be measured in a state shown in FIG. 13 in the case where any of the measurement beams Pi is not positioned outside of the light receiving area 33*c* of the light receiving sensor 33*b*, as shown in FIG. 21. The power distribution obtained in this measurement corresponds accurately to the power distribution of the lens 40.

There will now be explained the measurement of a power distribution taken by the aforementioned optical system and the operation taken by the arithmetic control circuit 100.

The light source images corresponding to the minute lenses 25*a* are formed on the lens 40. Each of the measurement beams Pi transmitted by the lens 40 is led to the lens 33*a* of the CCD camera 33 through the relay lens 32, and is then imaged on the light receiving area 33*c* of the light receiving sensor 33*b*. A principal ray of light Ps of the measurement beam Pi emitted from each of the minute lenses 25*a*, which is made incident upon the lens 40, is parallel to an optical axis O. The principal ray of light Ps is deflected after it has been transmitted by the lens 40, and a rate of the deflection is determined depending on an incidence height h (a position on a surface 40*a* of the lens 40 upon which the principal ray of light Ps is made incident) and also depending on the power of the lens 40 at the incident position.

When a deflection angle of the principal ray of light Ps which has been transmitted is taken as θ, power S (unit: diopter) at each point of the surface 40*a* is $$S = \tan\theta/(10h) \quad (1)$$

The height of the principal ray of light Ps according to each of the minute lenses 25*a* is known. Herein, when the height on the light receiving area 33*c* is taken as hi, the relay magnification is taken as β, and the distance from the reverse surface 40*b* of the lens 40 to the relay lens 32 is taken as Z, there is given a relative equation of $$\theta = \tan^{-1}\{(h-\beta hi)/Z\} \quad (2)$$

Thereby, if the unknown height hi on the light receiving area 33*c* is calculated and obtained by the arithmetic control circuit 100 according to an output signal sent from the light receiving sensor 33*b*, the deflection angle θ is obtained, and accordingly the power S is finally obtained by the equation (1).

Figure 14:
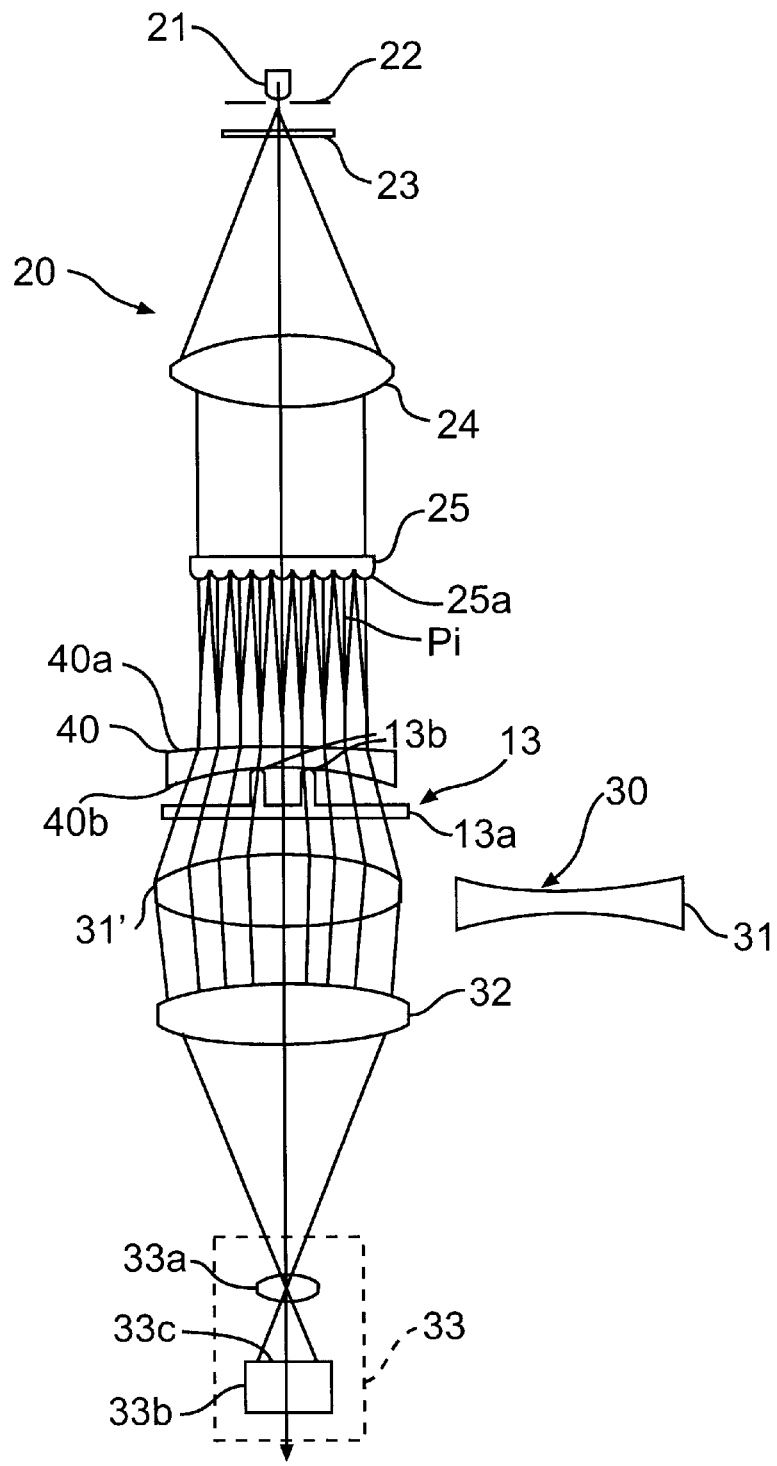
FIG. 14 is an optical view showing a state in which the lens having negative power and a measuring auxiliary lens having a known power distribution and positive power are inserted in the optical path for measurement.

As shown by broken lines in FIG. 13, if it is judged that the measurement beams Pi are refracted outwardly to a large extent, and also that a part of the measurement beams Pi is positioned outside of the light receiving area 33*c* of the light receiving sensor 33*b*, then it is meant that the lens 40 has intense negative power. Therefore, as shown in FIG. 14, a measuring auxiliary lens 31' having positive power in power distribution is inserted into the measuring optical path. In the case where the arithmetic control circuit 100 judges that the measurement beams Pi are not positioned outside of the light receiving area 33*c* of the light receiving sensor 33*b* when the measuring auxiliary lens 31' has been inserted, the measuring auxiliary lens 31' is inserted into the measuring optical path, and then the virtual power distribution including the power distribution of the lens 40 and the known power distribution is measured. Thereafter, the arithmetic control circuit 100 removes the known power distribution from the virtual power distribution, so that the accurate power distribution of the lens 40 is obtained. In the case where the measurement beams Pi are positioned outside of the light receiving area 33*c* of the light receiving sensor 33*b*, the measurement of a power distribution is stopped even though the measuring auxiliary lens 31' whose power distribution is known and whose power is positive is inserted in the measuring optical path. In the case where a spectacle lens is used as the lens 40, an optical system is designed such that the aforementioned situation can hardly occur.

Figure 15:
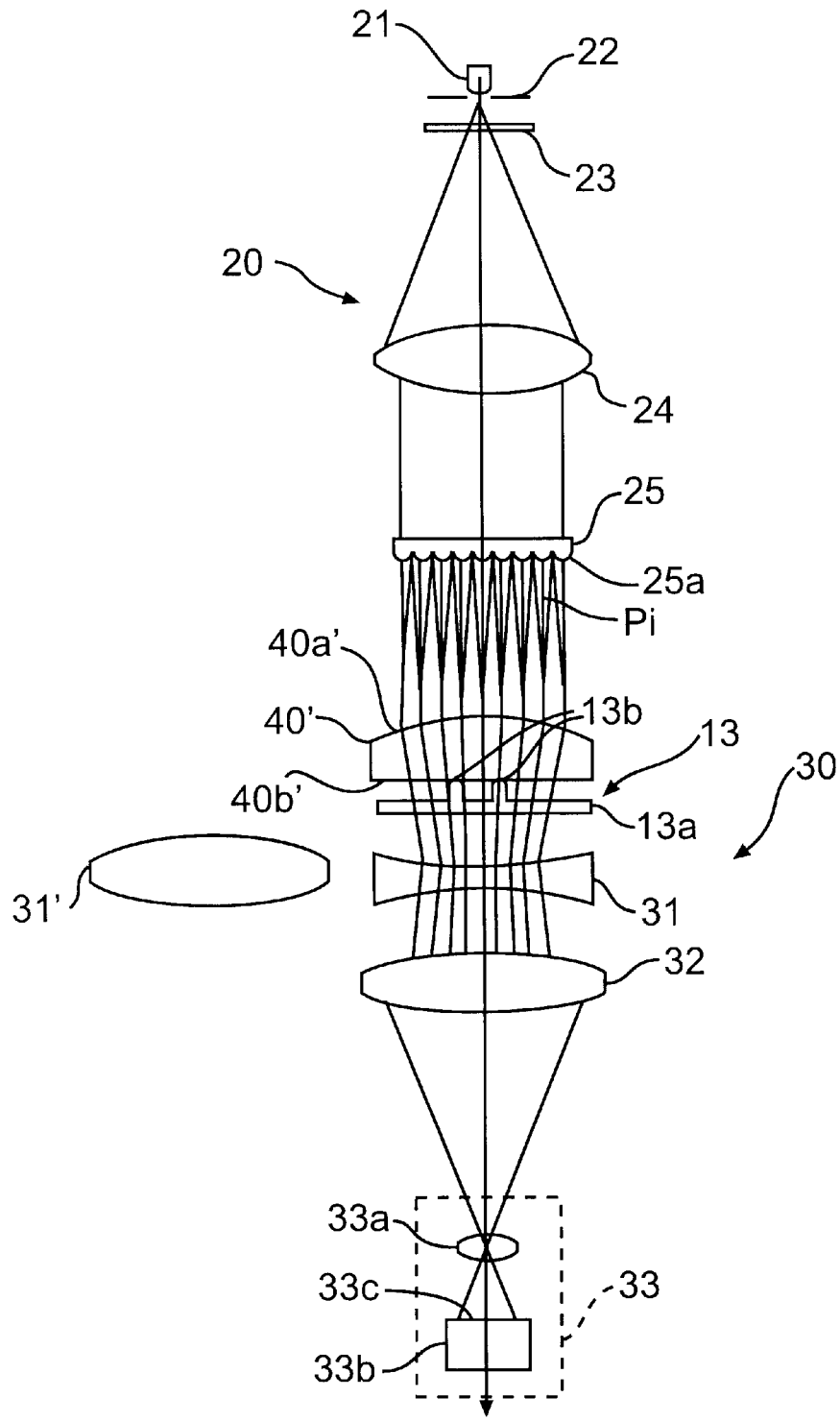
FIG. 15 is an optical view showing a state in which the lens having positive power and the measuring auxiliary lens having a known power distribution and negative power are inserted in the optical path for measurement.

As shown in FIG. 15, in the case where a lens 40' having positive power is set in the measuring optical path, the measurement beams Pi cannot be positioned outside of the light receiving area 33*c* of the light receiving sensor 33*b*, and thereby the arithmetic control circuit 100 judges that the lens 40' has positive power. When the arithmetic control circuit 100 has judged that the lens 40' has positive power, the arithmetic control circuit 100 removes the known power distribution from the virtual power distribution including the power distribution of the lens 40' and the known power distribution, and then finds the accurate power distribution of the lens 40', in a state where the measuring auxiliary lens 31 whose power distribution is known and whose power is negative is inserted in the measuring optical path.

Figure 16:
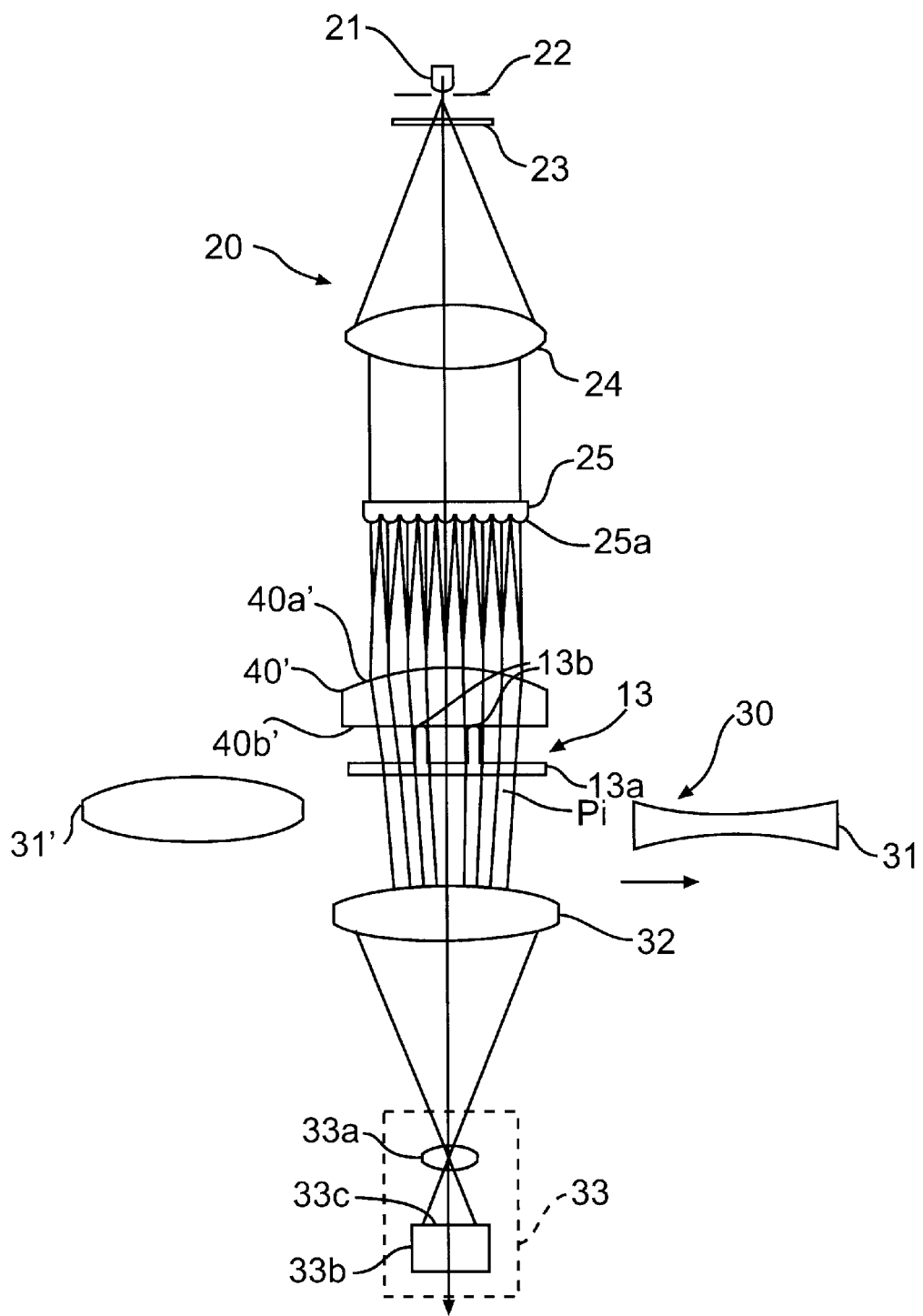
FIG. 16 is an optical view explaining that the intersection of a beam of measurement light does not occur when the lens having positive power is inserted in the optical path for measurement and the measuring auxiliary lens having a known power distribution and negative power is removed from the optical path.
Figure 17:
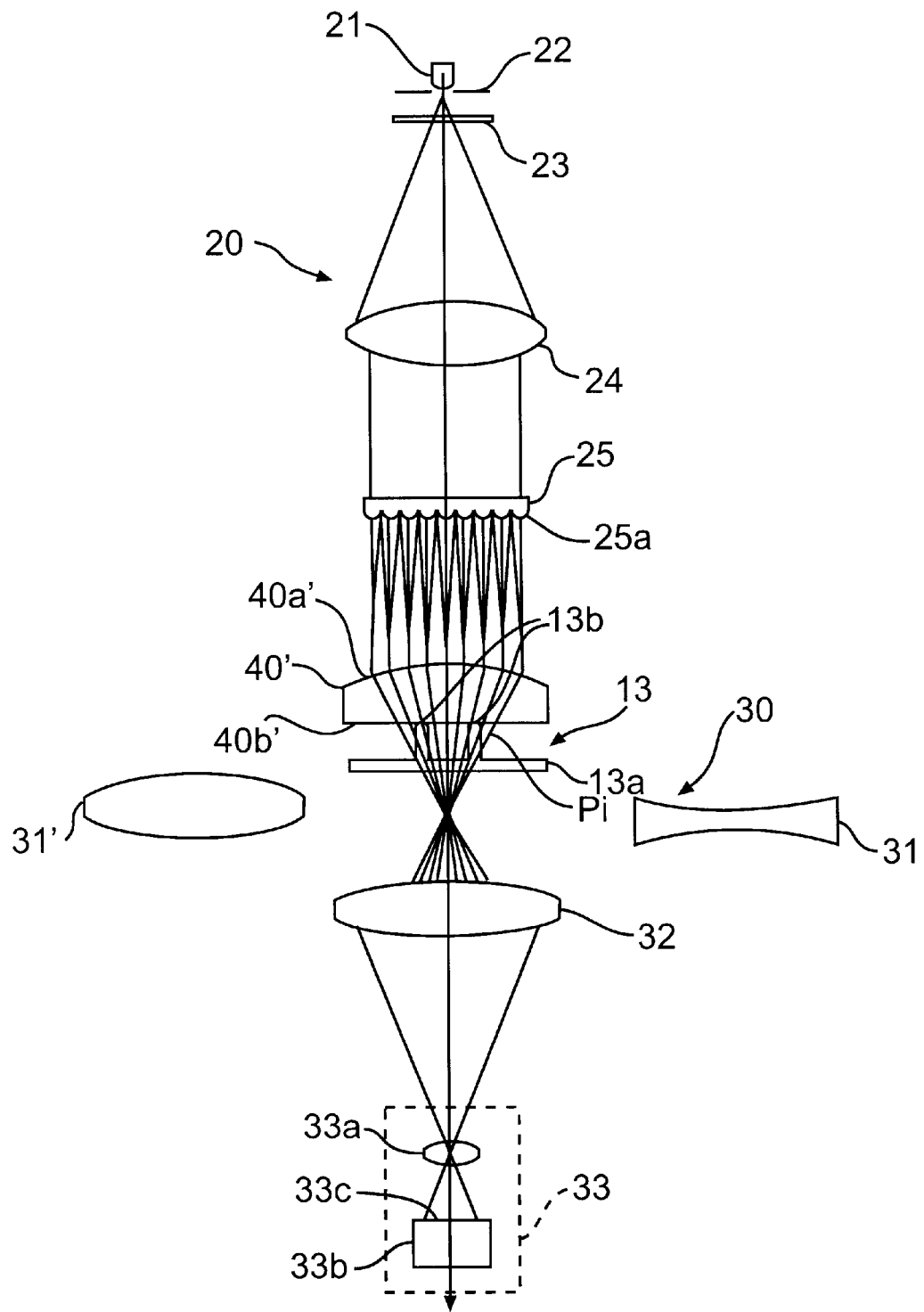
FIG. 17 is an optical view explaining that the intersection of the beam of measurement light occurs when the lens having positive power is inserted in the optical path for measurement and the measuring auxiliary lens having a known power distribution and negative power is removed from the optical path.
Figure 18:
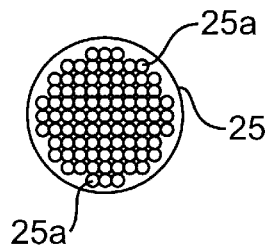
FIG. 18 is a plan view of a microlens array shown in FIG. 1.

This is for the reason mentioned in the following. In the case where there is not any difference between the power distribution of the lens 40' which has been measured by removing the measuring auxiliary lens 31 having known negative power from the measuring optical path, and the power distribution of the lens 40 which has been obtained by removing the known power distribution of the measuring auxiliary lens 31 from the virtual power distribution, as shown in FIG. 16, it is considered that there is not any intersection of the measurement beams Pi which have been transmitted by the lens 40' when the measuring auxiliary lens 31 has been removed from the measuring optical path. On the other hand, in the case where there is a difference between the power distribution of the lens 40' which has been measured by removing the measuring auxiliary lens 31 having known negative power from the measuring optical path, and the power distribution of the lens 40' which has been obtained by removing the known power distribution from the virtual power distribution, as shown in FIG. 17, the arithmetic control circuit 100 judges that there is an intersection of the measurement beams Pi which have been transmitted by the lens 40' when the measuring auxiliary lens 31 has been removed from the measuring optical path. Herein, the lenses 31, 31' are held on a turret disk, and the drive of the turret disk is controlled by a pulse motor, so that the lenses 31, 31' are inserted into and removed from the optical path. The arithmetic control circuit 100 controls the operation of the pulse motor. Since this structure is known, explanation by a figure is omitted.

Even in a state where the measuring auxiliary lens 31 whose power distribution is known and whose power is negative is inserted into the measuring optical path, it can be considered that there is an intersection of the measurement beams Pi. However, in the case where a spectacle lens is used as the lens 40', an optical system is designed such that the aforementioned situation can hardly occur.

Instead of the relay lens 32, a screen may be disposed so that the measurement beams Pi are received with the CCD camera 33 and thereby the power distributions of the lenses 40, 40' can be measured.

Second Embodiment

Figure 22:
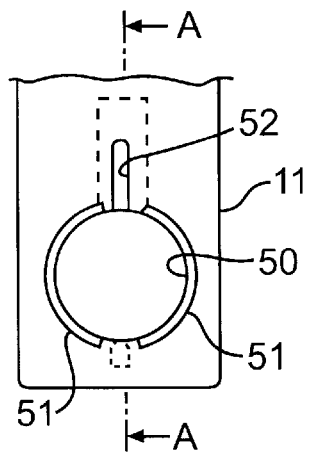
FIG. 22 is a plan view showing a second embodiment of distance determining means according to the present invention.
Figure 23:
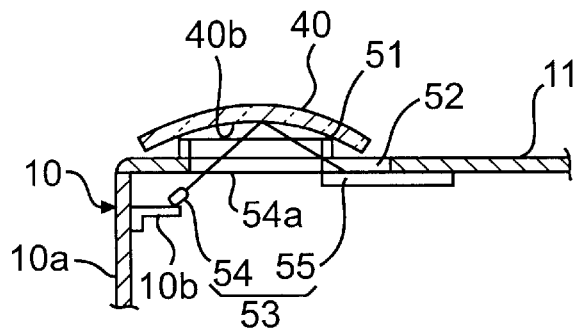
FIG. 23 is a sectional view taken along line A—A of FIG. 22.

FIGS. 22 and 23 show a second embodiment of the present invention.

In the aforementioned first embodiment, the lens platform 13 is used as a light guiding portion. However, the present invention is not necessarily limited to this. Thus, a light guiding hole 50 (a light guiding portion) which is formed in the lens-receiving table 11 and has a large diameter is used as a light guiding portion.

In this embodiment, circular-arc-shaped projections 51, 51 which extend substantially semi-circularly along right and left parts of the light guiding hole 50 are disposed as a lens platform on the lens-receiving table 11. Further, a slit-shaped notch 52 which is positioned between ends of the projections 51, 51 and is opened to the light guiding hole 50 is disposed in the lens-receiving table 11. Herein, the notch 52 extends in a direction perpendicular to the front side of the main body 2 (in a front and back direction).

Lens height detecting means 53 which is positioned inside of the lower optical-member-disposition portion 10 is disposed as lens position detecting means (distance determining means) below the lens-receiving table 11. Herein, the lens height detecting means 53 consists of a light source 54 and a line sensor 55. The light source 54 (light projecting means) is attached to the surface inside of a front wall 10a of the lower optical-member-disposition portion 10 via a bracket 10b, and the line sensor 55 is attached in a front and back direction to the under surface of the lens-receiving table 11.

Figure 25:
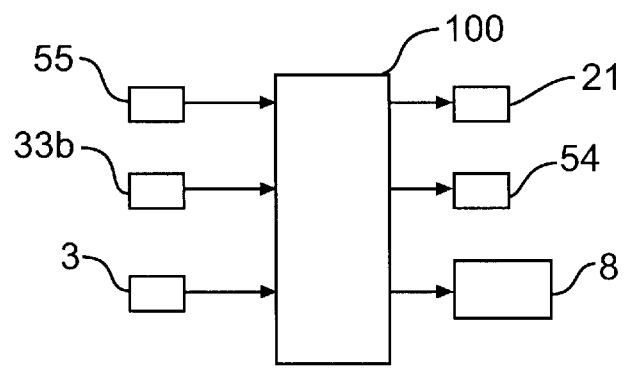
FIG. 25 is a control circuit diagram of the distance determining means shown in FIGS. 22 to 24.

Light emitted by the light source 54 is controlled by the arithmetic control circuit 100 shown in FIG. 25, and thus a measurement beam 54a from the light source 54 is designed to be projected onto substantially the middle of the circular-arc-shaped projections 51, 51 through the light guiding hole 50. The measurement beam 54a which has been reflected on the under surface 40b of the lens 40 mounted on the projections 51, 51 is designed to be projected onto the line sensor 55. An output signal of the line sensor 55 is inputted in the arithmetic control circuit 100. According to a position of the line sensor 55 where the light source 54 is projected, the height from the upper surface of the lens-receiving table 11 to the center of the under surface 40b of the lens 40 (a position on the measuring optical axis of the lens 40) is calculated by the arithmetic control circuit 100. Thereby, the distance Z from the under surface of the lens 40 to the relay lens 32, which is mentioned in the first embodiment, is calculated and obtained.

Figure 24:
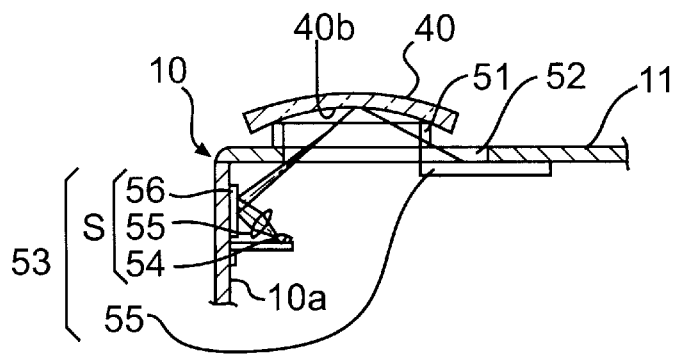
FIG. 24 is a sectional view showing a modification of the distance determining means shown in FIGS. 22 and 23.

In FIGS. 22 and 23, there is shown only the example where the light source 54 is used as the light projecting means for projecting a measurement beam. However, the present invention is not necessarily limited to this. For example, as shown in FIG. 24, an illumination optical system S where the measurement beam emitted from the light source 54 is designed to be projected onto the lens 40 through a lens 55 and a reflecting mirror 56 may also be used as the light projecting means. In this embodiment, the reflecting mirror 56 is fixed on the front wall 10a of the lower optical-member-disposition portion 10. The lens 55 is attached to the bracket 10b via holding means (not shown).

Third Embodiment

Figure 26:
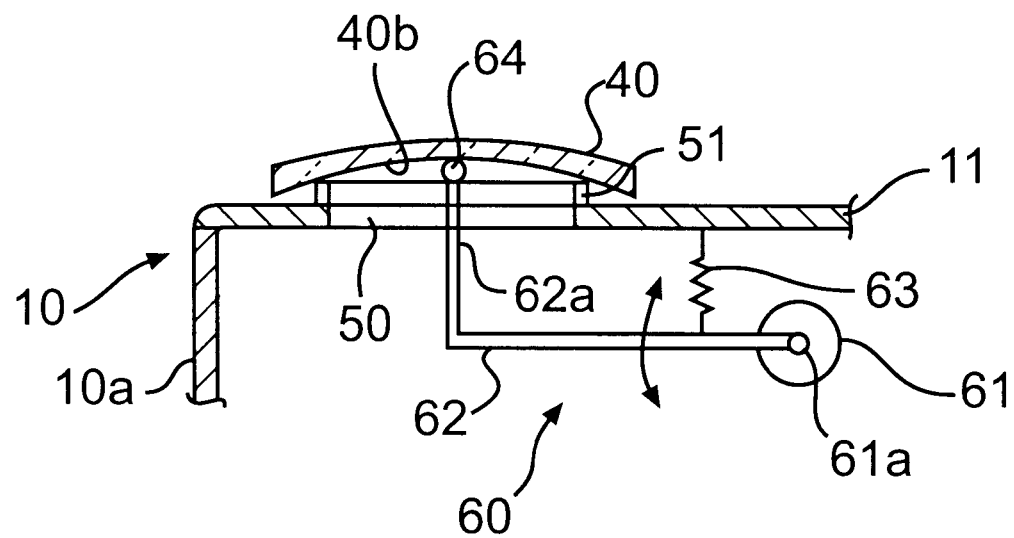
FIG. 26 is a sectional view showing a third embodiment of the distance determining means according to the present invention.
Figure 27:
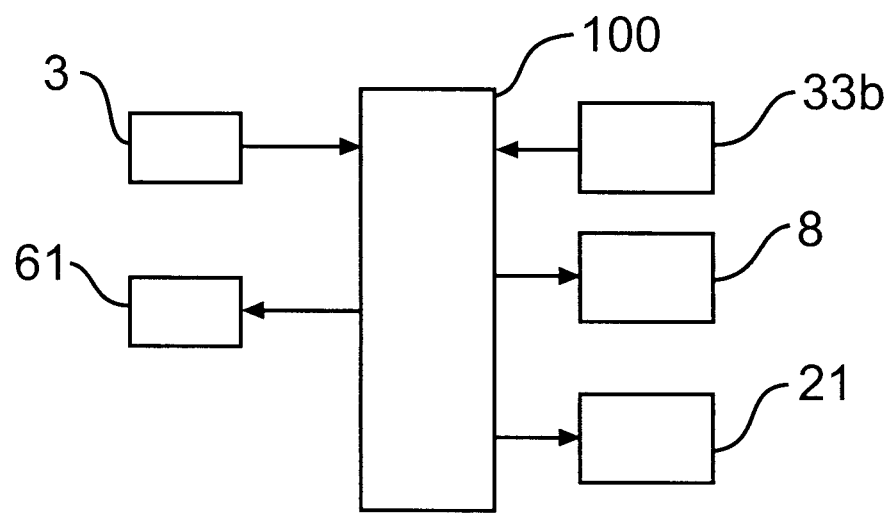
FIG. 27 is a control circuit diagram of the distance determining means shown in FIG. 26.

FIG. 26 shows a third embodiment of the present invention. Height measuring means 60 (distance determining means) shown in FIG. 26 is provided with a potentiometer 61 disposed inside of the lower optical-member-disposition portion 10, and an L-shaped measurement arm 62 whose base end part is fixed on an input axis 61a of the potentiometer 61. An output signal (a measurement signal) from the potentiometer 61 is, as shown in FIG. 27, inputted in the arithmetic control circuit 100.

A spring 63 having low pressure is attached between the measurement arm 62 and the lens-receiving table 11, and presses upward the measurement arm 62. Further, an end portion 62a of the measurement arm 62 is directed up, and a probe 64 is attached to the end portion 62a. Herein, the measurement arm 62 is kept out of the way (in the right direction of FIG. 26) by being moved pivotably while not being used.

In this embodiment, the arithmetic control circuit 100 is designed to find the height from the upper surface of the lens-receiving table 11 to the center of the under surface 40b of the lens 40 (the position on the measuring optical axis of the lens 40) according to the output signal sent from the potentiometer 61 in a position where the probe 64 comes in contact with the lens 40 by the pressure of the spring 63. Thereby, the distance Z from the under surface of the lens 40 to the relay lens 32, which is mentioned in the first embodiment, is calculated and obtained.

Fourth Embodiment

Figure 28:
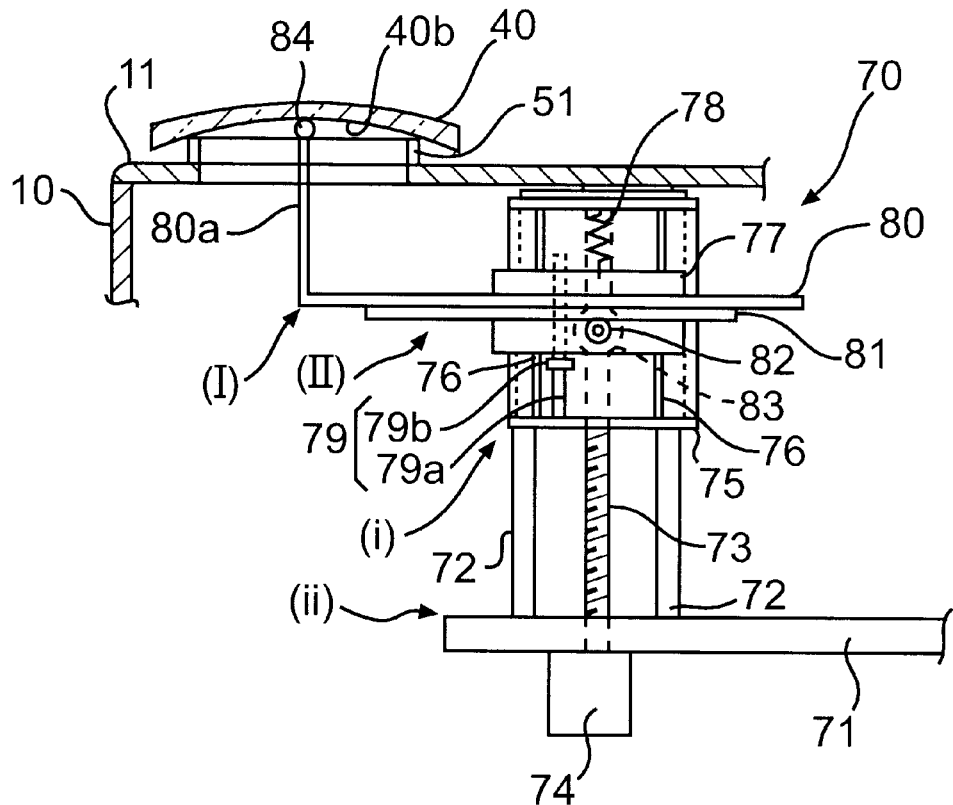
FIG. 28 is a sectional view showing a fourth embodiment of the distance determining means according to the present invention.
Figure 29:
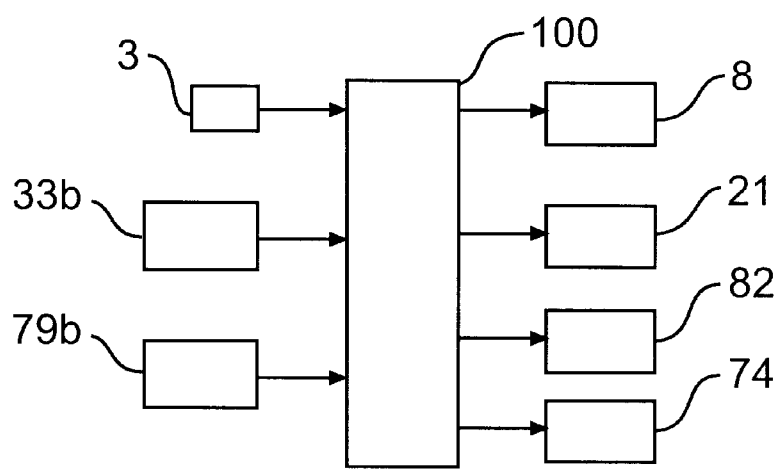
FIG. 29 is a control circuit diagram of the distance determining means shown in FIG. 28.

FIG. 28 shows a fourth embodiment of the present invention. In this embodiment, tracing means 70 for tracing the under surface 40b of the lens 40 in the radius direction, which is used as height measuring means (distance determining means), is disposed inside of the lower optical-member-disposition portion 10.

The tracing means 70 is provided with a bracket 71 which is fixed inside of the lower optical-member-disposition portion 10, guide rods 72, 72 which are stood and fixed at an interval in the front and rear direction and parallel with each other in the bracket 71, a feed screw 73 which is disposed between and parallel with the guide rods 72, 72 and is held rotatably in the bracket 71, a pulse motor 74 which is fixed in the bracket 71 and drives and rotates in the right and reverse directions the feed screw 73, and a sliding base 75 which is held to be movable in the up and down directions by the guide rods 72, 72 and is driven in the up and down directions by the feed screw 73. The drive of the pulse motor 74 is controlled by the arithmetic control circuit 100 shown in FIG. 29.

Further, the tracing means 70 is provided with guide rails 76, 76 which are held parallel with each other in the up and down direction in the sliding base 75, a slider 77 which is held movably in the up and down directions by the guide rails 76, 76, a spring 78 which is attached between the upper end of the sliding base 75 and the slider 77 and presses the slider 77 upward, a magnescale 79 for detecting a position where the slider 77 moves in the up and down directions. The magnescale 79 consists of a magnetic scale body 79a which is held parallel with the guide rail in the sliding base 75, and a reading head 79b which is held by the slider 77. The reading head 79b detects a length by which the slider 77 moves in the up and down directions by operating with the magnetic scale body 79a, and then outputs a detection signal. The output signal (the measurement signal) of the reading head 79b is inputted in the arithmetic control circuit 100.

Further, the tracing means 70 is provided with a measurement arm 80 which is held in the slider 77 to become movably in the front and back directions thereof, a rack 81 which is attached to the measurement arm 80, a pinion 82 which is engaged with the rack 81, and a pulse motor 83 for driving the pinion 82. The pulse motor 83 is fixed in the slider 77, and the operation thereof is controlled by the arithmetic control circuit 100. The measurement arm 80 includes an end portion 80*a* extending upward, and thus is formed in an L-shape. A probe 84 is attached to the end portion 80*a*.

In this construction, the operation of the pulse motor 74 is controlled by the arithmetic control circuit 100, a rotational drive of the feed screw 73 is then controlled by the pulse motor 74, and thereby the sliding base 75 is positioned at (i) while being used and at (ii) while not being used. The drive of the pulse motor 83 is controlled by the arithmetic control circuit 100, and thereby the end portion 80*a* of the measurement arm 80, that is, the probe 84, is positioned at (I) at the beginning of being used and at (II) while not being used.

FIG. 28 shows a state where the tracing means 70 has been set in an initial position at the time of being used. In this state, the probe 84 is in contact with the center of the under surface 40*b* of the lens 40 by the pressure of the spring 78. The contact position of the probe 84 can be found by the movement length from the position (ii) of the upper surface of the bracket 71 to the position (i) and by the output given by the magnescale 79 in the position where the probe 84 is in contact with the under surface 40*b* of the lens 40.

The drive of the pulse motor 83 is controlled, thereby the measurement arm 80 is moved from the position mentioned above to the right direction. Thereafter, the probe 84 is pressed and displaced downward against the pressure of the spring 78 by the influence of the curved under surface 40*b* of the lens 40, and thus the slider 77 is displaced downward together with the measurement arm 80. In this operation, the length by which the probe 84 of the measurement arm 80 moves in the right direction is obtained according to the drive amount (the drive pulse number) of the pulse motor 83, and the length by which the slider 77 moves downward is detected by the magnescale 79. Accordingly, the arithmetic control circuit 100 allows the position where the probe 84 moves in the right direction to correspond to the output signal (the measurement signal) given by the magnescale 79, so that the curved surface configuration (the curvature) of the under surface 40*b* of the lens 40 in the radius direction can be obtained as variations in height. In short, variations in the radius direction of the distance Z from the under surface of the lens 40 to the relay lens 32 which is mentioned in the first embodiment are calculated and obtained.

Thereby, the aforementioned distance Z from the under surface of the lens 40 to the relay lens 32 can be obtained, and in addition, the refractive index in the peripheral part of the lens 40 can be easily compensated.

As explained above, the lens meter according to the present invention comprises a lens-receiving table, an illumination optical system for projecting an illumination beam onto a lens to be inspected which is mounted on the lens-receiving table, a measuring optical system for guiding the beam transmitted by the lens to a light receiving sensor, arithmetic control means for measuring the two-dimensional optical characteristics of the lens according to a detection result of the light receiving sensor, a light guiding portion which is formed in the lens-receiving table and is capable of guiding to the light receiving sensor the light coming from the central part of the lens and from a predetermined range around the central part, distance determining means for determining a light reception distance from the lens to an optical member of the light receiving optical system, and thereby the lens meter is capable of determining a light reception distance regardless of the type of a lens to be inspected and also measuring the wide-ranging two-dimensional optical characteristics of the lens.

The lens meter further has a construction where the light guiding portion is a lens platform made from transparent material, the lens platform has a projection for holding the lens in the central part thereof, and the circumference of the projection is made of a transparent body corresponding to a light transmitting portion. Accordingly, the lens meter is capable of lessening errors in measurement by keeping a light reception distance constant regardless of the type of a lens to be inspected and also measuring the wide-ranging two-dimensional optical characteristics of the lens.

The lens meter further has a construction where the light guiding portion is a light guiding hole having a large diameter, and at least, height detecting means for detecting the height from the lens-receiving table to the under surface of the lens on the optical axis of a measurement beam is disposed as the distance determining means. Accordingly, the lens meter is usable for correction of the optical characteristics of the lens which have been measured and also measuring the wide-ranging two-dimensional optical characteristics of the lens.

The lens meter further has a construction where the height detecting means consists of light projecting means for projecting the measurement beam onto the under surface of the lens-receiving table, and a line sensor for receiving the measurement beam reflected from the under surface of the lens-receiving table. This lens meter can measure the position of the under surface of the lens in a simple construction. The lens meter further has a construction where tracing means for tracing the under surface of the lens in the radius direction is used as the height detecting means. This lens meter can measure the position of the under surface of the lens in the range from the central part to the circumferential part of the lens and can make the correction for measured values of the refractive power of the lens in the range from the central part to the circumferential part.

What is claimed is:
1. A lens meter, comprising:
    a lens platform having a plurality of projections for holding a lens to be inspected, an inner part surrounded by said plurality of projections, and an outer part outwardly extending from said plurality of projections;
    a measuring optical system, comprising:
        an illumination optical system having an illumination light source, said illumination optical system being configured to project a beam of illumination light emitted from said illumination light source onto the lens held by said plurality of projections, and allow the beam of illumination light to pass through said inner part and said outer part; and
        a light receiving optical system for guiding the beam transmitted through the lens, said inner part, and said outer part to a light receiving sensor;
    means for forming a large number of beams of measurement light projected onto said light receiving sensor; and
    arithmetic control means for measuring refractive characteristics at a plurality of positions in the lens.

2. The lens meter according to claim 1, wherein said light guiding portion around said lens holding projection is made of a transparent body serving as a light transmitting portion so that the rays of light coming from the middle of the lens and from the predetermined range around the middle of the lens can be guided to said light receiving sensor.

3. A lens meter, comprising:

a lens platform having a cylindrical projection for holding a lens to be inspected, an inner part surrounded by said cylindrical projection, and an outer part outwardly extending from said cylindrical projection;

a measuring optical system, comprising:

an illumination optical system having illumination light source, said illumination optical system being configured to project a beam of illumination light emitted from said illumination light source onto the lens held by said cylindrical projection, and allow the beam illumination light to pass through said inner part and said outer part; and a light receiving optical system for guiding the beam transmitted by the lens, said inner part, and said outer part to a light receiving sensor; and means for forming a large number of beams of measurement light projected onto said light receiving sensor; and arithmetic control means for measuring refractive characteristics at a plurality of positions in the lens.

4. The lens meter according to claim 2 or 3, wherein the beam of illumination light is guided to said light receiving sensor through an optical member by which the beam of illumination light is separated into a large number of rays of measurement light.

5. The lens meter according to claim 4, wherein said light receiving optical system is inserted into an optical path or removed therefrom selectively according to the refractive characteristics of positive or negative in power of the lens, and includes an auxiliary optical member by which said large number of rays of measurement light are guided to said light receiving sensor.

* * * * *